Dec. 19, 1933.    H. G. TAYLOR    1,939,735
METHOD OF MAKING CHAIN LINKS
Original Filed May 2, 1931

Humphrey George Taylor
Inventor
by
Lester L. Sargent,
Attorney.

Patented Dec. 19, 1933

1,939,735

UNITED STATES PATENT OFFICE 1,939,735

METHOD OF MAKING CHAIN LINKS

Humphrey George Taylor, Penn, near Wolverhampton, England

Original application May 2, 1931, Serial No. 534,632, and in Great Britain May 13, 1930. Divided and this application January 7, 1933. Serial No. 650,691

4 Claims. (Cl. 59—35)

The invention relates to the production of chain links of the type consisting of two U-shaped end members and a transverse stud, one end being joined to the other by butt arc welding, that is by passing a heavy electric current therethrough, and has for its object to make provision for a transverse stud in a very convenient and efficient manner.

Heretofore, in a welded link having a transverse stud, the latter has sometimes been separately welded in, but this is expensive and cannot be performed by butt arc welding, as the link is already closed. In another case the stud has been formed by wrapping one part of the link over the other; but, in this case also, the process of butt arc welding cannot be utilized.

The invention consists in first forming the link in two parts, the division being along the length of the stud whereby the latter is divided into two parts each part of the stud being integral with the respective end member and joining into it at its two ends, and one or each of said stud parts being divided transversely to allow the respective link end to be opened out to receive the next link and then closed up again, or said link part initially formed opened out, and then permanently joining the two parts of the link together by welding together the two parts of the stud along the length thereof.

If both stud parts are divided transversely, the next adjacent link at either side may be formed as a plain stamping with the two ends and the stud in one piece. If, however, only one stud part is divided transversely each link will be formed according to the invention.

The invention is described with reference to the drawing herewith, of which:—

Figure 1:
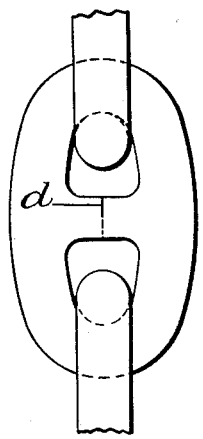
Figure 1 is a view of the link complete.
Figure 2:
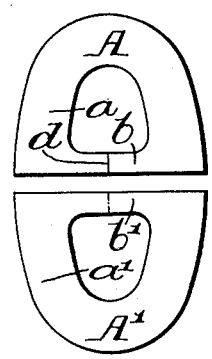
Figure 2 is a view of the two parts of the link divided as they appear before the welding operation.

It will be seen by reference to the drawing that the link is formed in two parts A, A', of which the part A comprises a loop $a$ and a half stud $b$ the stud being divided longitudinally into two equal parts, while the link part A' comprises a loop $a'$ and the other half $b'$ of the stud. The half stud $b$ is divided transversely at $d$ so that it can be opened out to receive the next link after which it is closed again. The two halves of the stud are then joined together by electric arc welding, the arc striking across the whole of the space between the stud halves whereby they may be permanently joined together.

The stud $b'$ may also be divided transversely if desired, as indicated by broken lines, in which case every alternate link of the chain may be a plain stamping with the ends and stud in one piece only, the other alternate links being formed according to the invention.

Having fully described my invention what I claim and desire to secure by Letters Patent is:—

1. A method of forming a chain link having two end portions of substantially U-shape and a transverse stud, said method consisting in forming two parts of a chain link, each part of the chain link having a longitudinal part of the stud integral therewith, one of said parts of the stud also being divided transversely to permit the insertion of the next link, positioning the two parts of the link with their stud surfaces in abutment, and then permanently joining the two parts of the link together by electrically welding together the two parts of the stud along the length thereof.

2. A method of forming a chain link having two end portions of substantially U-shape and a transverse stud, said method consisting in forming two parts of a chain link, each part of the chain link having a longitudinal part of the stud integral therewith, each of said parts of the stud also being divided transversely to permit the insertion of the respective adjacent links, positioning the two parts of the link with their stud surfaces in abutment, and then permanently joining the two parts of the link together by electrically welding the two parts of the stud along the length thereof.

3. A method of forming a chain link having two U-shaped end portions and a transverse stud, said method consisting in forming two substantially U-shaped members, each of said U-shaped members having a longitudinal half of a stud integral therewith and providing an abutting surface for said halves of the stud, one of said stud elements also being divided transversely to permit the insertion of the next link, positioning the two U-shaped end members with the aforesaid longitudinal surfaces of the stud elements in abutment, and then permanently joining the two parts of the link together by electrically welding together the two halves of the stud along the length thereof.

4. A method of forming a chain link having two end portions of U-shape and a transverse stud, said method consisting in forming two substantially U-shaped parts of a chain link, each of said U-shaped parts having a longitudinal half of a stud integral therewith and providing an abutting surface for halves of the stud, each of said stud elements also being divided transversely to permit the insertion of the respective adjacent links, positioning the two parts of the link with the surfaces of the halves of the stud in abutment, and then permanently joining the two halves of the stud along the length thereof.

HUMPHREY GEORGE TAYLOR.